(12) United States Patent
Chase

(10) Patent No.: US 7,526,871 B1
(45) Date of Patent: May 5, 2009

(54) PRECISION MACHINIST'S SQUARE WITH INDICATOR

(76) Inventor: Russell Chase, 6626 Guhn Rd., Houston, TX (US) 77040

( * ) Notice: Subject to any disclaimer, the term of this patent is extended or adjusted under 35 U.S.C. 154(b) by 0 days.

(21) Appl. No.: 12/100,496

(22) Filed: Apr. 10, 2008

(51) Int. Cl.
*B43L 7/10* (2006.01)
*G01B 3/56* (2006.01)

(52) U.S. Cl. .............................. 33/471; 33/535; 33/475

(58) Field of Classification Search .................. 33/471, 33/535, 474, 475, 480, 452, 465
See application file for complete search history.

(56) References Cited

U.S. PATENT DOCUMENTS

| | | | | |
|---|---|---|---|---|
| 41,396 A | * | 1/1864 | Richards | 33/471 |
| 2,397,280 A | * | 3/1946 | Leszak | 33/421 |
| 3,380,165 A | * | 4/1968 | Urbau | 33/471 |
| 3,688,412 A | * | 9/1972 | Keener | 33/535 |
| 4,338,725 A | | 7/1982 | Martin et al. | |
| 4,442,606 A | * | 4/1984 | Graham et al. | 33/1 N |
| 4,446,627 A | | 5/1984 | Persson | |
| 4,955,141 A | | 9/1990 | Welch | |
| 5,020,233 A | | 6/1991 | Syken | |
| 5,058,284 A | * | 10/1991 | Stevenson | 33/535 |
| 5,133,135 A | * | 7/1992 | Durfee, Jr. | 33/534 |
| 5,189,804 A | * | 3/1993 | Ostachowski | 33/471 |
| 5,208,992 A | | 5/1993 | Syken | |
| 5,452,522 A | | 9/1995 | Kook et al. | |
| 5,459,935 A | * | 10/1995 | Paulson et al. | 33/451 |
| 5,461,794 A | | 10/1995 | Huang | |
| 5,461,798 A | | 10/1995 | Ribeiro | |
| 5,472,029 A | | 12/1995 | Ketch | |
| 5,809,659 A | | 9/1998 | Martin | |
| 6,330,752 B1 | * | 12/2001 | Ellam | 33/471 |
| 6,453,568 B1 | | 9/2002 | Hymer | |
| 6,536,124 B1 | * | 3/2003 | Eskew et al. | 33/471 |
| 6,785,976 B1 | | 9/2004 | Morehouse | |
| 6,895,675 B2 | | 5/2005 | Albright et al. | |
| 6,920,735 B1 | | 7/2005 | Lambert et al. | |
| 6,954,990 B2 | * | 10/2005 | Ellis | 33/471 |
| 7,124,668 B2 | | 10/2006 | Hiland, Jr. | |
| 7,343,688 B2 | | 3/2008 | Price | |
| 2004/0154176 A1 | * | 8/2004 | Montenegro et al. | 33/471 |

* cited by examiner

*Primary Examiner*—Christopher W Fulton
(74) *Attorney, Agent, or Firm*—Law Office of Tim Cook PC

(57) ABSTRACT

A precision machinist's square comprises a blade and body joined together at a pivot and a drive train operated by relative angular movement between the blade and the body. Movement of the drive train develops a movement in a dial indicator that is a function of the angle between the body and the blade.

6 Claims, 2 Drawing Sheets

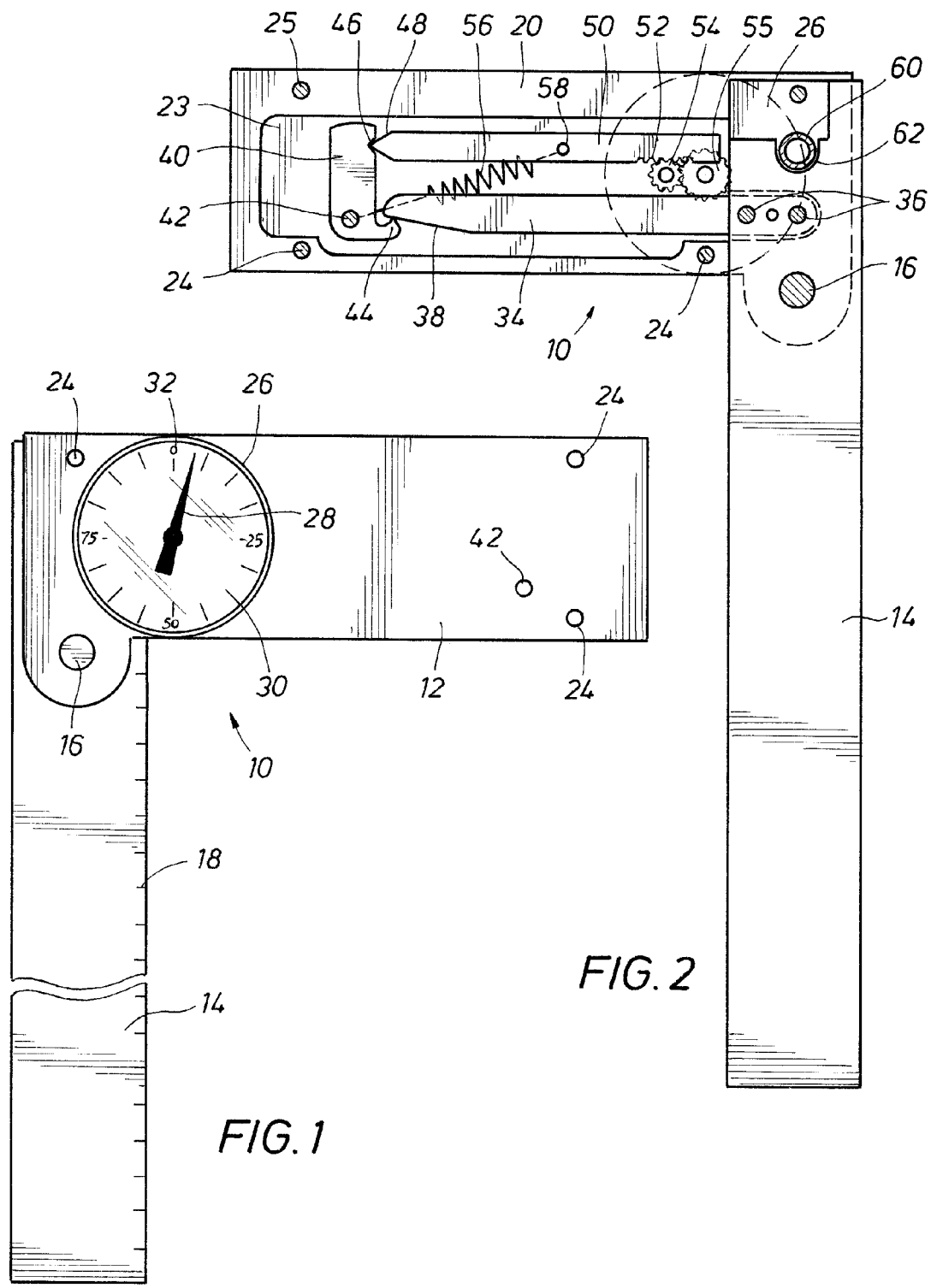

1

PRECISION MACHINIST'S SQUARE WITH INDICATOR

FIELD OF THE INVENTION

The present invention relates generally to the field of manual tools and more particularly to a machinist's square which incorporates a scale or other indicator to show the relative angular or other position relationship between a blade and a body of the square.

BACKGROUND OF THE INVENTION

A machinist's square or engineer's square is the metalworkers' equivalent of a try square. It consists of a steel blade inserted and either welded or pinned into a heavier body at an angle of 90°. Thus, the blade and the body typically define an angle that is very nearly a right angle, within the manufacturing tolerances of the square. A machinist's square is typically purchased as one of a set of squares of different sizes to accommodate different sizes of workpieces.

In use, the body of the square is aligned against one edge of the object and the blade is presented to the end or body of the object to be measured. If the end is being checked, then a strong light source behind the square will show any mismatch between the blade of the square and the end of the object. The mismatch will appear as a thin, acute triangular sliver of light between the square and the object being measured. The purpose of this action is to either check for squareness or to mark out the body of the workpiece.

One can immediately appreciate that this measurement technique is dependent on the skill of the machinist and, even among the most skillful machinists in the art, introduces a certain subjectivity to the measurement. If the square is placed at an inappropriate angle to the body, then the body may appear to be square while having an unacceptable error. Even if the square is properly placed against the workpiece and an error in the angle of measurement is indicated, the machinist can only estimate that amount of the error. Thus, there remains a need for a tool which is automatically adjustable to conform to the angle under measurement and provide an indication and an objective measure of the degree of error in the measurement. The present invention is directed to filling this need in the art.

SUMMARY OF THE INVENTION

The precision machinist's square disclosed herein comprises a blade and body joined together at a pivot and a drive train operated by relative angular movement between the blade and the body. Movement of the drive train develops a movement in a dial indicator that is a function of the angle between the body and the blade. The drive train is spring loaded to maintain the drive train at a predetermined rest position. A limiter pin limits the amount of relative movement between the body and the blade and defines the rest position.

These and other features and advantages of the precision machinist's square will be apparent to those of skill in the art from a review of the following detailed description along with the accompanying drawing figures.

BRIEF DESCRIPTION OF THE DRAWINGS

FIG. 1 is a front view of a machinist's square.

FIG. 2 is a back view of the square with a cover removed, showing the drive train.

DETAILED DESCRIPTION OF A PREFERRED EMBODIMENT

Figure 3:
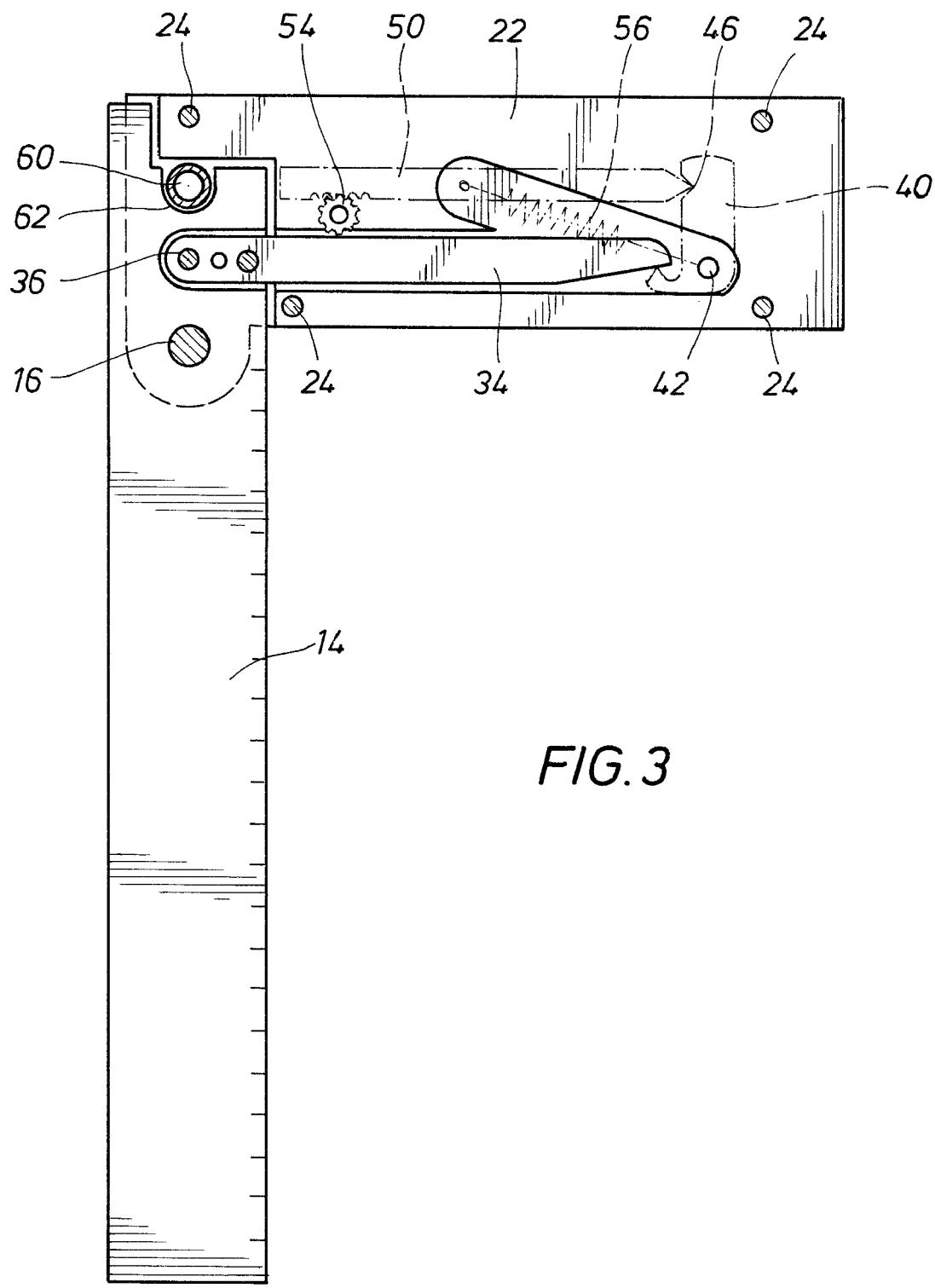
FIG. 3 is a front view of the square depicting a limiter pin.

FIG. 1 illustrates a precision machinist's square 10 comprising a body 12 and a blade 14, joined together at a square pivot 16. The blade preferably comprises a unitary piece of material, such as steel and may be marked with graduations 18. The body, on the other hand, is preferably formed of a top body member 20 (FIG. 2) and a bottom body member 22 (FIG. 3). The top and bottom body members are held together with a plurality of joining elements, such as screws, pins, or rivets 24, or other joining means as described. A chamber 23 is formed in the top and bottom body members, such as by machining or casting, providing space for the driving train mechanism.

Returning to FIG. 1, the square 10 further includes an indicator 26 which provides an indication of the relative position between the body and the blade. The indicator 26 is shown in FIG. 1 as a dial indicator, but may comprise a digital readout or other means, to show the position of the blade relative to the body. The indicator 26 may therefore include an arrow 28 which points to a measured position along graduations 30. In one preferred embodiment, the arrow 28 points to a zero position 32 when the angle to be measured is exactly 90°. As the angle varies from 90°, the arrow moves about the dial indicator to a different reading along the graduations 30. The graduations may be calibrated in thousandths of an inch (0.001") as measured at the end of the blade 14, such as for example 6 inches to the end of the blade. If the workpiece being measured is, for example three inches wide, then the scale reading is divided by the ratio of the width of the workpiece and the length of the blade. In this example, the reading is thus halved. The graduations 30 may also be calibrated in millimeters or an angular measurement, at the convenience of the machinist.

As previously described, the body 12 is preferably formed of top and bottom body members 20 and 22, respectively. Referring now to FIGS. 2 and 3, FIG. 2 depicts the top body member 20 with the blade 14 rotatably mounted thereto at a pivot 16. In a preferred embodiment, a driving arm 34 is securely mounted to the blade 14 with pins 36, so that the driving arm moves with the movement of the blade. The pivot 16 is outside the driving arm 34 to enable proper relative movement of the remainder of the drive train. Alternatively, the driving arm 34 may be formed as an integral part of the blade 14.

The driving arm 34 defines a contact face 38 for abutting contact with a rocker 40, which is mounted to the top body member 20 for rotational movement at a rocker pivot 42. A rocker arm 44 extends from one end of the rocker 40 for abutting contact with the contact face 38 of the driving arm 34. At the other end of the rocker is a groove 46 for contact with a knife blade 48 of a rack 50. The groove and knife blade arrangement allows the rocker to drive the rack 50 in a back and forth reciprocating motion without imparting any side force against the knife blade. The rack 50 further defines a set of gear teeth 52 which mesh with the teeth of a pinion gear 54 which drives the arrow 28 of the dial indicator 26 by way of a gear 55. Those of skill in the art will recognize other equivalent drive arrangements between the drive arm and the dial indicator, within the scope and spirit of this invention.

A spring 56 is attached at one end to the rack 50 at a attachment point 58 and at the other end of the spring at the pivot 42, for convenience. The spring preferably performs two functions. First, the spring 56 maintains an engaging pressure to keep the rack's gear teeth 52 in engagement with the pinion gear 54. Second, the spring holds the square in a predetermined rest position so that, after the square has been used to determine a measured angle, the drive train is pulled back into its desired quiescent state.

This feature can also be seen in FIG. 3. A limiter pin 60 is mounted to the bottom body member 22. A pin-receiving recess 62 is formed in the blade 14. The pin 60 fits within the recess 62 and, as the blade and body are at rest relative to one another, the pin contacts one side of the recess. Then, as the blade and body rotate relative to one another, the pin contacts the other side of the recess, thereby limiting the amount of travel to protect the dial indicator mechanism.

It should also be clear to those of skill in the art that the square described herein could just as easily be used to measure inside corners. Further, if a job calls for a repeated measurement of some angle other than 90°, the square is equally applicable.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A machinist's square comprising:
    a. a body having a pivot mounting arm extending from the body;
    b. a blade;
    c. a square pivot rotatably mounting the body to the blade at the pivot mounting arm;
    d. a dial indicator depicting the relative angular position between the body and the blade; and
    e. a drive train between the body, the blade, and the indicator, the drive train comprising:
        i. a driving arm rigidly mounted to the blade, the driving arm defining a contact face;
        ii. a rocker pivotably mounted to the body at a rocker pivot and rotated by abutting contact with the contact face, the rocker defining a groove;
        iii. a rack defining a knife blade operably positioned within the groove of the rocker, the rack reciprocally driven by the rocker; and
        iv. a pinion gear in meshing engagement with the rack, wherein the dial indicator is driven by the pinion gear.

2. The square of claim 1, further comprising a spring having a first end attached to the rack and a second end attached to the body.

3. The square of claim 1, wherein the body is formed of top and bottom body members.

4. The square of claim 3, further comprising a chamber between the top and bottom body members, the chamber enclosing the drive train.

5. The square of claim 1, further comprising:
    a. a recess in the blade; and
    b. a limiter pin mounted to the body and extending into the recess to define the rest position between the body and the blade and to limit the angular travel between the body and the blade.

6. The square of claim 1, wherein the indicator reads "zero" only when the blade and body are exactly 90° relative to one another.

* * * * *